United States Patent [19]

Liberti

[11] Patent Number: 4,646,918

[45] Date of Patent: Mar. 3, 1987

[54] DOUGH RISING PAN STACKING DEVICE

[76] Inventor: Giovanni Liberti, 301 New York Ave., Clark, N.J. 07066

[21] Appl. No.: 800,276

[22] Filed: Nov. 21, 1985

[51] Int. Cl.⁴ .............................................. B65D 21/00
[52] U.S. Cl. .................... 206/499; 220/23.6; 206/804; 206/821; 206/501; 206/557
[58] Field of Search ............... 206/499, 804, 821, 501, 206/557; 220/23.6, 20, 22

[56] References Cited

U.S. PATENT DOCUMENTS

| 2,925,206 | 2/1960 | Hancock | 206/499 |
| 2,944,124 | 7/1960 | Arnold | 206/499 |
| 3,351,264 | 11/1967 | Bostrom | 206/499 |
| 3,407,079 | 10/1968 | Griffith et al. | 206/499 |
| 3,608,945 | 9/1971 | Heitz | 206/499 |
| 3,788,487 | 1/1974 | Danson | 206/499 |
| 3,856,178 | 12/1974 | Norgaard | 206/499 |
| 4,043,485 | 8/1977 | Tippetts | 206/499 |
| 4,269,169 | 5/1981 | Guibert | 206/499 |
| 4,319,680 | 3/1982 | Hiemstra | 206/499 |

Primary Examiner—Joseph Man-Fu Moy
Attorney, Agent, or Firm—Richard L. Miller

[57] ABSTRACT

A case in which stacks of dough rising pans are held, the case being divided into vertical compartments for the stacks, an access opening on top of the case for placement of the pans thereinto, caster wheels under the case and handles on a side to pull the case and move it from place to place.

3 Claims, 5 Drawing Figures

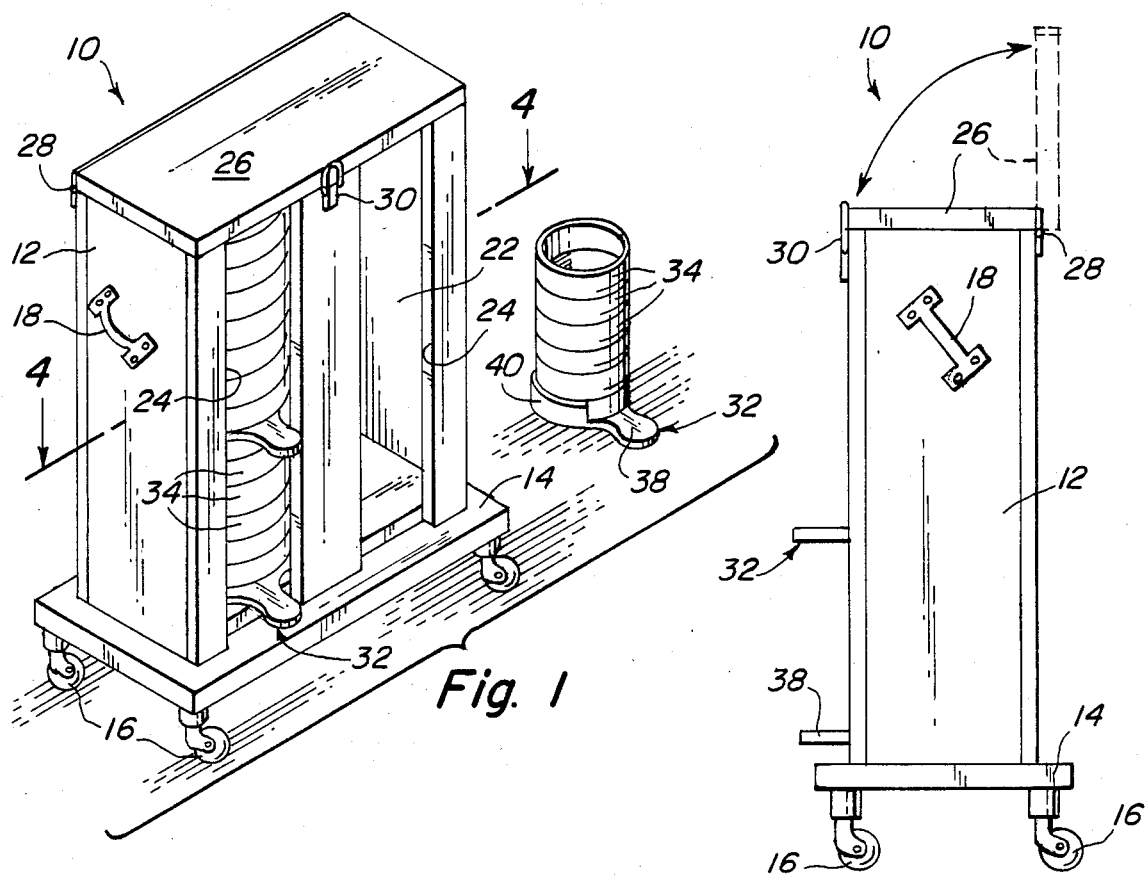
Fig. 1
Fig. 2
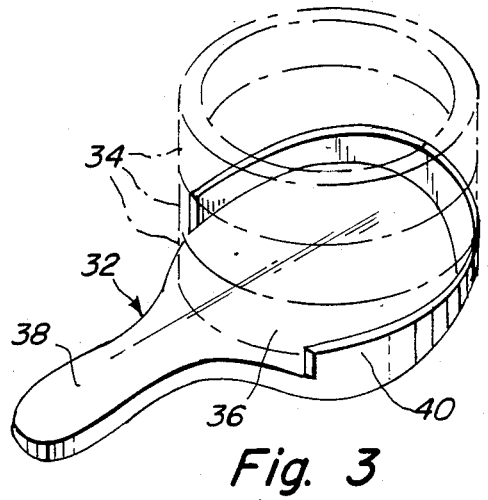
Fig. 3
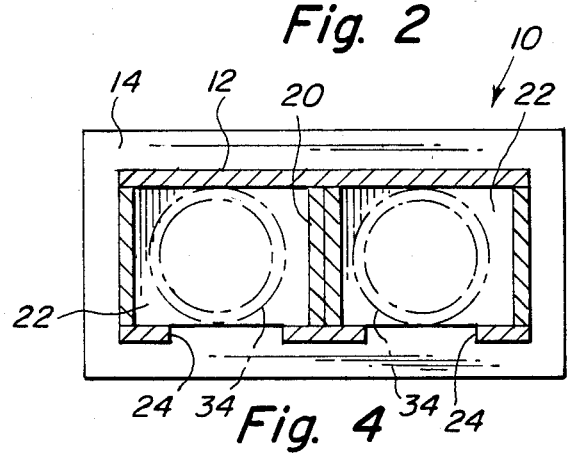
Fig. 4
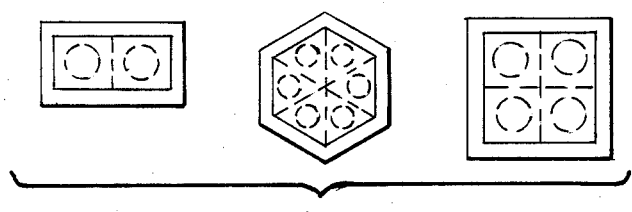
Fig. 5

DOUGH RISING PAN STACKING DEVICE

BACKGROUND OF THE INVENTION

This invention relates generally to pizza pie production devices. More specifically it relates to such devices as are used in the commercial production of pizza pies wherein large numbers of pizza pies are made by mass production methods. There is still a need at this time for improved handling of many pizza pies at a same time during the stage when the pizza pie yeast dough are left to rise, so that this handling may be done more quickly and efficiently thus resulting in greater production at lower cost so as to increase profits.

SUMMARY OF THE INVENTION

Therefore it is a principal object of the present invention to provide a dough rising pan stacking device wherein a great many pans containing dough may be kept during a dough rising period, the device holding the pans conveniently stacked in minimum space and the device being on wheels so as to be easily moved between an area where the dough is initially kneaded and a heated area where the kneaded dough is then left to rise prior to removal therefrom and transported to a place for final kneading and prepared for baking.

Another object accordingly is to provide a dough rising pan stacking device which is suitable for use by an establishment that prepares initially raised dough for a plurality of pizza pies and which is then delivered to individual pizza pie restaurants or pizza pie stands for selling to individual customers.

Another object is to provide a dough rising pan stacking device which alternately may be used in a pizza pie retailing stand or restaurant alone wherein an entire pizza pie production is done.

Still another object is to provide a dough rising pan stacking device which is suitable for handling rising dough for breads or other pastries besides pizza pie crusts.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention.

FIG. 2 is a side view thereof.

FIG. 3 is a perspective view of the tray holder.

FIG. 4 is a cross sectional view taken on line 4—4 in FIG. 1.

FIG. 5 is a reduced top diagrammatic plan view showing various typical shapes the invention can be formed in.

DETAILED DESCRIPTION OF PREFERRED EMBODIMENT

Referring now to the Drawing in greater detail, the reference numeral 10 represents a dough rising pan stacking device for preparing pizza pie crust, according to the present invention, wherein these is an upright case 12 mounted upon a horizontal platform 14 which is supported upon caster wheels 16 in order that it may be conveniently moved between a place where individual yeast dough pieces are initially formed and a place where the dough are left to use, and finally to a place where the risen dough are then prepared for baking. Handler 18 on opposite side walls of the case aid in pulling the device between these places.

A vertical partition 20 divides the interior of the case into two vertical compartments 22 in each of which a stack of the dough may be held. Each compartment has a full length opening 24 on a front side of the case for access thereinto.

A cover 26 closes a top opening upon the case; the cover being pivoted on hinges 28 and being secured in closed position by a latch 30.

Within each compartment a plurality of tray holders 32 may be stored, and upon each tray holder a plurality of trays 34 may be placed. Each tray holder comprises a circular panel 36 having a projecting handle 38 formed along its edge. An upwardly flange 40 is formed along a remainder of the edge for retaining a lowermost tray upon the holder. When the tray holders are placed inside the case compartment, then the handler project outwardly of the case opening 24 for easy grasp in the hand. The upper ends of the openings 24 communicate with the top opening of the case, thus permitting holding the handle while the tray holder is slided vertically in or out of the top opening and along the opening 24 of each compartment. Each tray is circular and all trays are a same size and are provisioned so as to stack one upon another. Each tray holds a piece of dough for forming one pizza pie and includes enough space for the dough to rise therein.

While the above description relates to pizza pies, it is readily understood that this device may alternately serve for rising dough to make breads or another rising pastry.

In use, the device may be used for delivery of rising dough from a primary dough making establishment to several retail stores selling the finished pizza pie or the like. The devices 10 may be shipped in a truck there between.

As shown in FIG. 5, the case may be made in any shape and include different numbers of compartments, for handling more or less dough rising pans.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A dough rising pan stacking device for preparing pizza pie crust, comprising, in combination, a case comprising a plurality of vertical compartments having an open front and an open top, said compartments separated by a partition wall, a cover hingedly coupled to said case to close said open top, a plurality of tray holders slidably fitting into said vertical compartments, each tray holder having a base wall, an upstanding peripheral flange wall on said base wall, and a handle projecting from said base wall outwardly through said open front, a plurality of nesting trays vertically stacked, the lower most tray fitting onto said base wall and fitting within said peripheral flange, each of said compartments holding a vertical stack of said tray holders with said trays in said tray holders, the pizza pie crust being placed within said trays, whereby all of said trays are covered by one of said tray holder, said cover or another tray to thereby prevent contamination to the pizza pie crust.

2. The combination as set forth in claim 1, wherein a latch secures said cover in a closed position.

3. The combination as set forth in claim 2, wherein said case is supported upon a plurality of caster wheels, for movement between different areas.

* * * * *